United States Patent [19]

Davis

[11] 3,936,967
[45] Feb. 10, 1976

[54] EMERGENCY SIGN DEVICE

[76] Inventor: Charles H. Davis, 302 Rollins Ave., Dothan, Ala. 36301

[22] Filed: July 18, 1974

[21] Appl. No.: 489,766

Related U.S. Application Data

[63] Continuation of Ser. No. 352,685, April 19, 1973, abandoned.

[52] U.S. Cl. .............................. 40/129 C; 40/125 C
[51] Int. Cl.² ........................................ G09F 21/04
[58] Field of Search .......... 40/129 C, 125 C, 129 R, 40/125 R, 125 H, 125 N; 281/33

[56] References Cited
UNITED STATES PATENTS

| | | | |
|---|---|---|---|
| 914,777 | 3/1909 | Aarons | 40/125 C |
| 1,691,049 | 11/1928 | Douglas | 281/33 |
| 3,195,925 | 7/1965 | Walker | 281/33 |
| 3,471,958 | 10/1969 | Westin | 40/129 C |

*Primary Examiner*—Louis G. Mancene
*Assistant Examiner*—John F. Pitrelli
*Attorney, Agent, or Firm*—Watson, Cole, Grindle & Watson

[57] ABSTRACT

A device capable of being mounted on a horizontal surface of a motor vehicle for exhibiting emergency signs includes three plate sections hinged together along two side edges thereof to form a triangular-shaped sign support. The remaining side edge of the sections are detachably interconnected by means of fasteners, and means are provided on one of the plate sections for detachably mounting the support on the horizontal surface. Channel means, are provided on another of the plate sections for the reception of interchangeable emergency signs.

2 Claims, 6 Drawing Figures

EMERGENCY SIGN DEVICE

This is a continuation of application Ser. No. 352,685, filed Apr. 19, 1973, now abandoned.

This invention relates generally to sign exhibiting and more particularly to a collapsible sign support for exhibiting emergency signs on a horizontal surface of a motor vehicle.

Any motorist experiencing motor vehicle trouble can appreciate the perplexities of being stranded on the highway without available assistance, out of communication with the police and other emergency services. Many of such motorists therefore attempt to alert others by raising the engine hood of their automobile indicating motor trouble or a need of gas, or by even attempting to wave-down passers-by. Other motorists passing by are, however, extremely reluctant to render assistance because of a fear for their own safety. If the stranded motorist could specifically announce to others his reason for stopping off the highway, passers-by could at least render some assistance without stopping. For example, display of an "out of gas" sign or an "engine trouble" sign would permit the passer-by motorist to render assistance by simply stopping off at the nearest service station or police station to relay the message of the stranded motorist. The safety of both the passer-by and stranded motorist is thereby not endangered.

The prinicpal object of this invention is therefore to provide an emergency sign carrying device of simple and economical construction which can be easily stored by the motorist and assembled for mounting on a horizontal surface of his motor vehicle.

Another object is to provide such a device as including three plate sections hinged together along two side edges thereof to form a triangular-shaped sign support when assembled. The plate sections may be folded into a collapsed condition in which they are disposed parallel to one another so that the support may be easily stored.

A further object of this invention is to provide such a device wherein mounting means are provided on one of the plate sections for detachably mounting the support on the motor vehicle horizontal surface, and convenient securing means is provided for detachably securing together a free edge of the plate sections so as to lock the sections together when assembled.

A still further object of the invention is to provide such a device wherein spaced channel-forming means are provided on one of the plate sections for the reception of display signs for emergency conditions.

Other objects, advantages and novel features of the invention will become apparent from the following detailed description of the invention when considered in conjunction with the accompanying drawings wherein.

Figure 1:
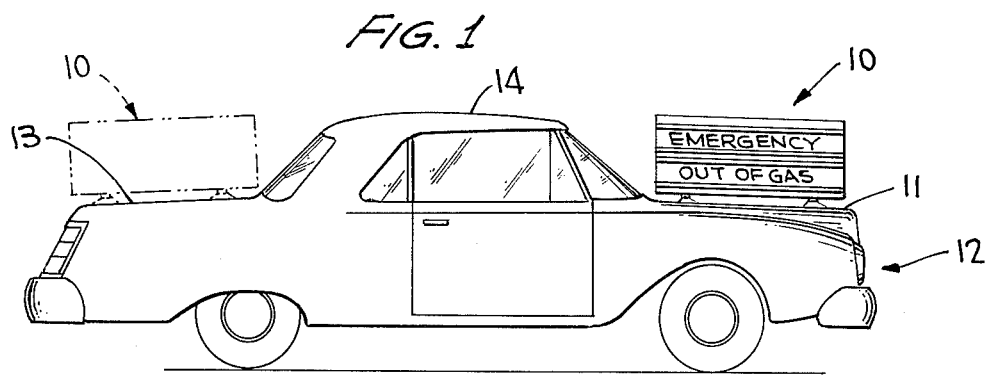
FIG. 1 is a side elevational view of a motor vehicle showing the device of the present invention mounted thereon.
Figure 2:
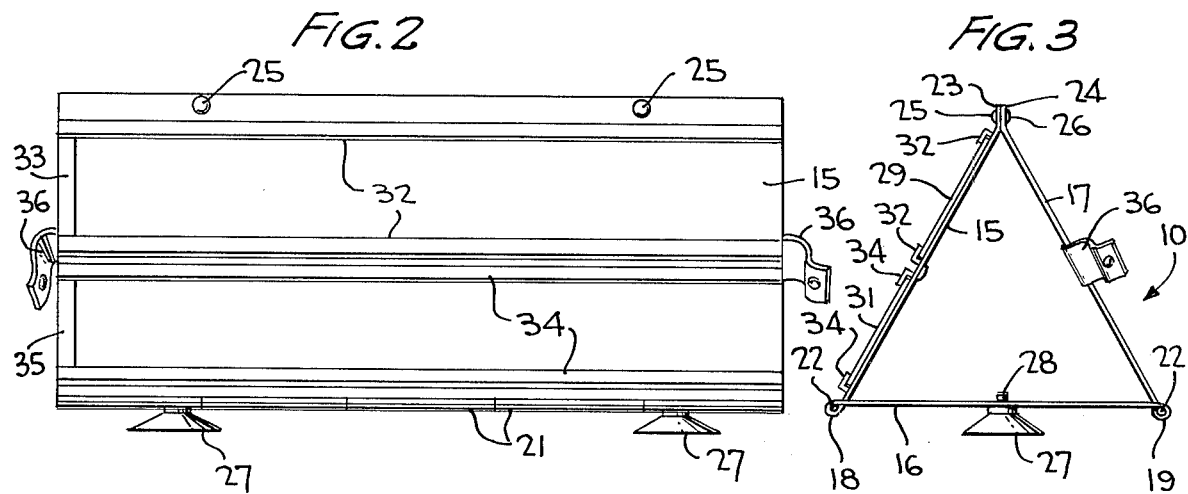
FIG. 2 is a side elevational view of the present device.
Figure 3:
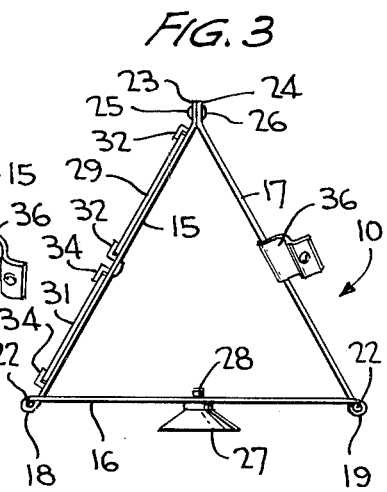
FIG. 3 is an end elevational view of the device of FIG. 2.

Turning now to the drawings wherein like reference characters refer to like and corresponding parts throughout the several views, the emergency sign or display device 10 of the present invention is shown generally in FIG. 1 as mounted on the horizontal hood surface 11 of a motor vehicle 12 indicating, for example, that the stranded motorist is out of gas in an emergency situation. Of course, such device 10 may be alternatively mounted in place on the horizontal trunk lid surface 13 as shown in phantom lines in FIG. 1, or the device may be mounted on the horizontal roof surface 14 of the motor vehicle as well. The details of the device are shown in FIGS. 2 and 3 as comprising first, second and third plate sections 15, 16 and 17, respectively. A first hinge means 18 interconnects plate sections 15 and 16 together along their adjacent side edges, and a second hinge means 19 interconnects plate sections 16 and 17 together along their adjacent side edges in a similar manner. Both hinge means include the standard integral hinge plates 21 and hinge pins 22. The free ends of plates 15 and 17 are joined together as in FIG. 3 by a detachable securing means which include outwardly extending abutting flanges 23 and 24 provided along the free edges of respective plate sections 15 and 17. The securing means further include fasteners such as the standard male and female snap buttons 25, 26. As can be seen, each of the plate sections are of the same size and rectangular shape so as to together form a triangular-shaped support for displaying the emergency signs when assembled. Means are provided on one of the plate sections for detachably securing the support on to a horizontal surface 11, 13 or 14 of the motor vehicle. Such means may comprise a pair of suction cups 27 having threaded studs 28 thereon for threaded engagement with a suitable opening provided in plate section 16. The support may therefore be conveniently mounted in place without the likelihood of falling from its horizontal surface, and may also be conveniently removed when necessary. Of course, permanent magnetic discs (not shown) may also be used in lieu of the suction cups.

Figure 4:
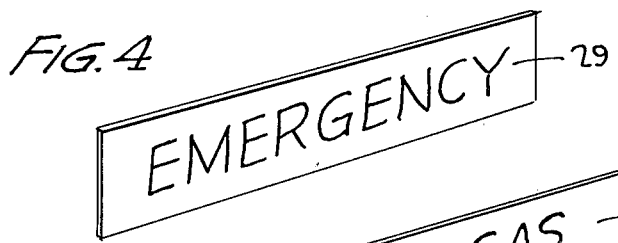
FIGS. 4 and 5 are views showing typical signs which may be displayed on the emergency sign device.
Figure 5:
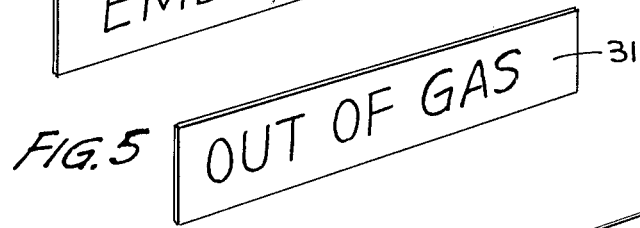

Means are provided on another of the plate sections for the reception of interchangeable emergency signs such as 29 and 31 shown in FIGS. 4 and 5. Such means include a pair of spaced, horizontal, channel-forming angle members 32 mounted on plate section 15 and opening toward one another as shown in FIG. 3. A vertical end stop channel-forming member 33 may be provided between members 32 at one end of plate 15. Accordingly, a sign or card such as indicating an emergency situation 29 may be conveniently slid into place between members 32 from the open end thereof. Another pair of similar channel-forming angle members 34 may also be mounted on plate section 15 parallel to and below members 32, a vertical stop member 35 also being provided between members 34 so that a card or sign such as 31 indicating an out-of-gas situation, may be slid between members 34 from the open end until it reaches stop 35.

Figure 6:
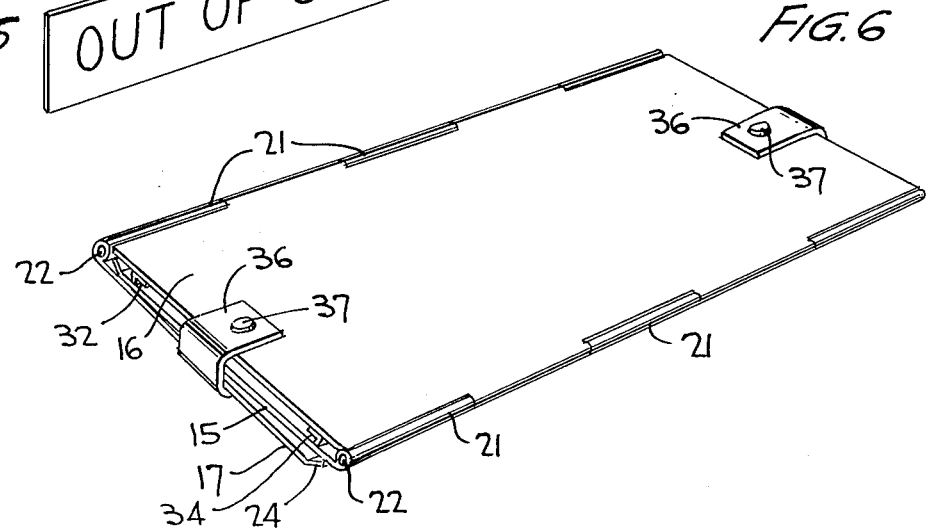
FIG. 6 is a perspective view of the device in its collapsed condition.

Straps 36 are each secured at one end thereof to plate section 17, for example, to permit the plate sections to be secured together in their collapsed condition as shown in FIG. 6. Accordingly, male and female snap buttons 37 are provided for holding the collapsed plate sections together as straps 36 are snapped in place on plate section 16.

The device or card support 10 is normally stored in the motor vehicle in its collapsed condition as shown in FIG. 6. During an emergency condition, the motorist simply unsnaps straps 36 and pivots plate sections 15 and 17 about their hinges so as to abut together flanges 23 and 24 thereof to form a triangular-shaped support as shown in FIG. 3. Snap fasteners 25 and 26 are interengaged, and suction cups 27 are mounted in place. Any one or two of a select number of signs or cards such as 29 and 31 may be thereafter slid into place between angle members 32 and/or 34. Alternatively, several of these signs may be stored in place by means of these angle members when the device is in its collapsed condition of FIG. 6. The signs are not shown in this Figure although it should be understood that one or more may already be positioned between angle members 32 and/or between angle members 34. Straps 36 are therefore designed as having a width sufficient to cover the inner ones of angle members 32 and 34 so that any signs already in place in the stored condition of FIG. 6 will not accidentally slide out. After assembling the support as in FIG. 3, select one or more signs depending on the emergency condition at hand. The assembled support of FIG. 3 may therefore be mounted in place on one of the horizontal surfaces of the motor vehicle.

Although only two signs or cards 29 and 31 are shown, it should be understood that any number of different signs may be provided without departing from the scope of the invention. For example, one sign may have "engine trouble" printed thereon, another sign may have printed "flat tire" thereon, and so on.

Obviously, many modifications and variations of the present invention are possible in the light of the above teachings. It is therefore to be understood that within the scope of the appended claims, the invention may be practiced otherwise than as specifically described.

What is claimed is:

1. A device capable of being mounted on a horizontal surface of a motor vehicle for exhibiting emergency signs, comprising first, second and third plate sections of equal size, first hinge means interconnecting one side edge of said second plate section with one side edge of said first plate section, second hinge means interconnecting the other side edge of said second plate section with one side edge of said third plate section, flanges extending outwardly from the other side edges of said first and said third plate sections and being rigidly connected thereto, said flanges forming an angle greater than 90° with the outer surfaces of said first and said third plate sections, detachable fasteners provided on said flanges for detachably securing said first and third plate sections together in an assembled triangular-shaped support in which said flanges are in face-to-face contact with one another, means on one of said plate sections for detachably mounting said support to the horizontal motor vehicle surface, at least one pair of spaced, parallel channel-forming elements on another of said plate sections extending parallel to said side edges and opening toward one another for the reception of interchangeable emergency signs, and fastener means on said one plate section and on the remaining one of said plate sections for securing all of said plate sections together in a collapsed condition lying substantially parallel to one another, said fastener means including straps extending outwardly of opposite end edges of said one and said remaining plate sections and overlapping with opposite end edges of said another plate section in the collapsed condition of said support, said straps being located on said one and said remaining plate sections so as to lie between said channel-forming elements when overlapping said another plate section, whereby the emergency signs are completely prevented from moving outwardly of said elements while in said collapsed condition.

2. The device according to claim 1 wherein said mounting means comprise at least one suction cup secured to said one plate section for removably mounting said support.

* * * * *